(12) United States Patent
Cai et al.

(10) Patent No.: US 8,971,242 B2
(45) Date of Patent: Mar. 3, 2015

(54) SYSTEM AND METHOD FOR COMPONENT CARRIER REALLOCATION

(75) Inventors: Zhijun Cai, Euless, TX (US); Yi Yu, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 1194 days.

(21) Appl. No.: 12/750,285

(22) Filed: Mar. 30, 2010

(65) Prior Publication Data
US 2010/0251054 A1 Sep. 30, 2010

Related U.S. Application Data

(60) Provisional application No. 61/164,789, filed on Mar. 30, 2009.

(51) Int. Cl.
*H04W 4/00* (2009.01)
*H04J 3/14* (2006.01)
(Continued)

(52) U.S. Cl.
CPC .............. *H04L 1/1887* (2013.01); *H04L 1/1812* (2013.01); *H04L 1/1877* (2013.01); *H04L 1/1893* (2013.01); *H04L 5/0078* (2013.01); *H04L 5/0096* (2013.01)
USPC ........... 370/328; 370/252; 370/236; 370/315; 370/335; 375/262; 714/749

(58) Field of Classification Search
USPC .......... 714/749; 370/315, 328–329, 335, 252, 370/236; 375/262
See application file for complete search history.

(56) References Cited

U.S. PATENT DOCUMENTS

2007/0286080 A1* 12/2007 Kim et al. ...................... 370/236
2008/0219219 A1* 9/2008 Sartori et al. .................. 370/335
(Continued)

FOREIGN PATENT DOCUMENTS

| WO | 2007061342 A1 | 5/2007 |
| WO | 2008084961 A2 | 7/2008 |
| WO | 2008139319 A2 | 11/2008 |

OTHER PUBLICATIONS

Ericsson; TSG-RAN WG1 #55bis; Title: Control Signaling for Carrier Aggregation; R1-090375; Ljubljana, Slovenia; Jan. 12-16, 2009; 3 pgs.
(Continued)

*Primary Examiner* — Kiet G Tang
(74) *Attorney, Agent, or Firm* — Conley Rose, P.C.; J. Robert Brown, Jr.

(57) ABSTRACT

A method for supporting Hybrid Automatic Repeat Request (HARQ) transmission during component carrier (CC) reallocation. The method includes starting a HARQ process using a first CC, allocating a second CC, mapping the HARQ process from the first CC to the second CC, and transmitting remaining HARQ data associated with the HARQ process using the second CC. Also included is a method for supporting HARQ transmission during CC reallocation comprising starting a HARQ process using a first CC, determining to allocate a second CC, waiting until completion of the HARQ process using the first CC before allocating the second CC, and beginning another HARQ process on the second CC. Included is a method comprising starting a HARQ process using a first CC, allocating a second CC, discontinuing transmission using the first CC before completion of the HARQ process, and restarting new data using the second CC.

20 Claims, 7 Drawing Sheets

(51) Int. Cl.
  *H04J 1/10* (2006.01)
  *H04B 7/216* (2006.01)
  *H04L 5/12* (2006.01)
  *H04L 1/18* (2006.01)
  *H04L 5/00* (2006.01)

(56) References Cited

U.S. PATENT DOCUMENTS

| | | | |
|---|---|---|---|
| 2009/0285109 A1* | 11/2009 | Chin et al. | 370/252 |
| 2009/0300456 A1* | 12/2009 | Pelletier et al. | 714/749 |
| 2010/0172428 A1* | 7/2010 | Pani et al. | 375/262 |
| 2010/0232382 A1* | 9/2010 | Gauvreau et al. | 370/329 |
| 2011/0274032 A1* | 11/2011 | Leng et al. | 370/315 |

OTHER PUBLICATIONS

3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.
3GPP TS 36.331 v8.4.0; 3rd Generation Partnership Project; Technical Specification Group Radio Access Network; Evolved Universal Terrestrial Radio Access (E-UTRA) Radio Resource Control (RRC); Protocol Specification; Release 8; Dec. 2008; 198 pgs.
3GPP TS 36.304 v8.4.0; 3rd Generation Partnership Project; Technical Specification Group Radio Access Network; Evolved Universal Terrestrial Radio Access (E-UTRA); User Equipment (UE) Procedures in Idle Mode; Release 8; Dec. 2008; 29 pgs.
3GPP TS 36.213 v8.5.0; 3rd Generation Partnership Project; Technical Specification Group Radio Access Network; Evolved Universal Terrestrial Radio Access (E-UTRA); Physical Layer Procedures; Release 8; Dec. 2008; 74 pgs.
3GPP TS 36.212 v8.5.0; 3rd Generation Partnership Project; Technical Specification Group Radio Access Network; Evolved Universal Terrestrial Radio Access (E-UTRA); Multiplexing and Channel Coding; Release 8; Dec. 2008; 58 pgs.
PCT International Preliminary Report on Patentability; PCT Application No. PCT/2010/029225; Jun. 9, 2011; 14 pages.
PCT International Search Report; PCT Application No. PCT/US2010/029225; Dec. 16, 2010; 6 pgs.
PCT Written Opinion of the International Searching Authority; PCT Application No. PCT/US2010/029225; Dec. 16, 2010; 13 pgs.
3GPP TSG RAN WG1 #56; LG Electronics; Title: HARQ Mapping Across Aggregated Component Carriers; R1-080652 (R1-090652); Athens, Greece; Feb. 9-13, 2009; 3 pgs.
Siemens AG, et al.; Title: Downlink PDCCH Signaling and CQI Measurement for LTE-A Bandwidth Extension; IP.com No. IPCOM000178173D; Feb. 13, 2009; 6 pgs.
PCT Invitation to Pay Additional Fees (Partial Search Report); PCT Application No. PCT/US2010/029225; Aug. 25, 2010; 5 pgs.
3GPP TS 36.213 V8.3.0; 3rd Generation Partnership Project; Technical Specification Group Radio Access Network; Evolved Universal Terrestrial Radio Access (E-UTRA); Physical Layer Procedures; Release 8; May 2008; 45 pages.
Chinese Office Action; Application No. 201080023917.3; Oct. 30, 2013; 30 pages.
Chinese Office Action as Recieved in Co-pending Application No. 201080023917.3 on Jul. 3, 2014; 12 pages.
Chinese Office Action as Received in Co-pending Application No. 201080023917.3 on Nov. 21, 2014; 3 pages.

* cited by examiner

SYSTEM AND METHOD FOR COMPONENT CARRIER REALLOCATION

CROSS-REFERENCE TO RELATED APPLICATIONS

The present application claims priority to U.S. Provisional Patent Application No. 61/164,789 filed Mar. 30, 2009, by Zhijun Cai, et al, entitled "System and Method For Component Carrier Reallocation", which is incorporated by reference herein as if reproduced in its entirety.

BACKGROUND

As used herein, the terms "user equipment" and "UE" can refer to mobile devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" can also refer to devices that have similar capabilities but that are not transportable, such as fixed line telephones, desktop computers, set-top boxes, or network nodes. When a UE is a network node, the network node could act on behalf of another function such as a wireless device or a fixed line device and simulate or emulate the wireless device or fixed line device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UE, where the remote UE represents the wireless device in the network. The term "UE" can also refer to any hardware or software component that can terminate a communication session for a user. Also, the terms "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE) or LTE-Advanced (LTE-A). For example, an LTE or LTE-A system might include an Evolved Universal Terrestrial Radio Access Network (E-UTRAN) node B (eNB), a wireless access point, or a similar component rather than a traditional base station. As used herein, the term "access node" will refer to any component of the wireless network, such as a traditional base station, a wireless access point, an LTE or LTE-A eNB, or a router that creates a geographical area of reception and transmission coverage allowing a UE or a relay node to access other components in a telecommunications system. In this document, the term "access node" and "access device" may be used interchangeably, but it is understood that an access node may comprise a plurality of hardware and software.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
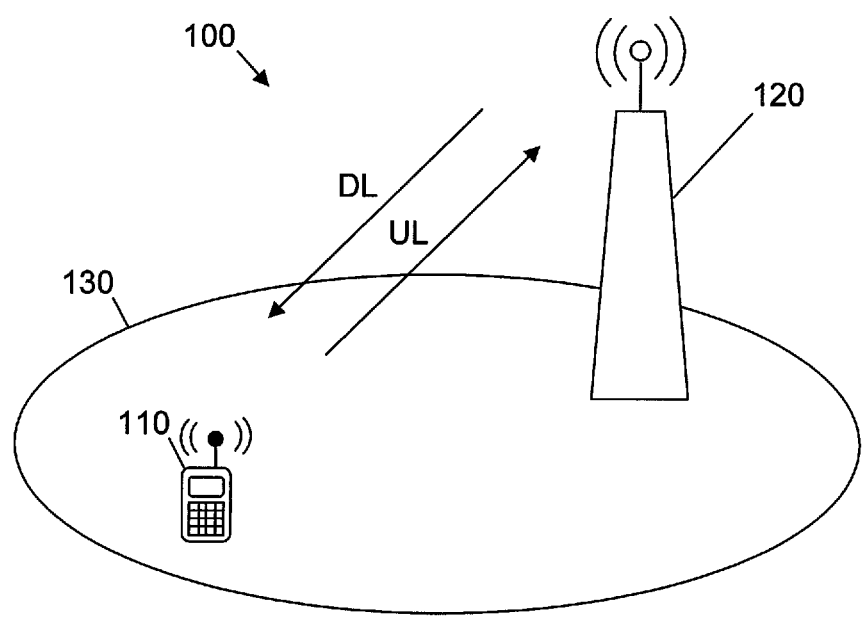
FIG. 1 is a diagram of an embodiment of a wireless communication system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases it is desirable for an access device to transmit a large amount of data to a UE in a short amount of time. For instance, a video broadcast may include large amounts of audio and video data that has to be transmitted to a UE over a short amount of time. As another instance, a UE may run several applications that all have to transmit data packets to an access device essentially simultaneously so that the combined data transfer is extremely large. One way to increase the rate of data transmission is to use multiple component carriers (CC), e.g., multiple carrier frequencies instead of a single CC to communicate between an access device and the UEs.

LTE-A is a mobile communication standard that is currently being decided by the 3rd Generation Partnership Project (3GPP) as a major enhancement of LTE. In LTE-A, the access device and the UE may communicate user data and control data using a plurality of CCs. The CCs may be distributed about equally over a predetermined combined bandwidth, e.g., each CC may comprise about an equal portion of the combined bandwidth. When transmission errors occur, the data may be retransmitted using a Hybrid Automatic Repeat Request (HARQ) process. Accordingly, additional error detection and correction bits may be added to the transmitted data. If the recipient of the transmitted data is able to successfully decode the data block, then the recipient may accept the data block. If the recipient is not able to decode the data block, the recipient may then request a retransmission of the data. However, when the CCs allocated for data transmission are switched or reallocated during the HARQ transmission, the retransmitted HARQ data may not be properly detected, such as when a CC used to retransmit the data is switched.

Disclosed herein is a system and method for supporting HARQ transmission during CC switching or reallocation. In one embodiment, the access device may reallocate the CCs for the UE during HARQ transmission and then restart the HARQ transmission. Thus, the UE may discard the HARQ data retransmitted before reallocating the CCs and use the reallocated CCs to restart receiving the new HARQ transmissions. Restarting HARQ transmission and discarding the previously retransmitted HARQ data may be simple to implement but may sometimes waste some system resources. Instead, to save some system resources during HARQ transmission, the access device may wait for the HARQ transmission to be completed before reallocating the CCs for the UE. However, such solution may limit the CC reallocation process and the data transmission rate, such as when the UE may require additional CCs to support an increase in its data transmission rate. In an alternative solution, the CCs allocated before switching may be mapped to the reallocated CCs, for instance using a mapping table, which may be sent to the UE. Thus, the HARQ transmission may continue substantially without interruption during the reallocation of the CCs.

FIG. 1 illustrates an embodiment of a wireless communication system 100. FIG. 1 is exemplary and may have other components or arrangements in other embodiments. The wireless communication system 100 may comprise at least one UE 110 and an access device 120. The UE 110 may wirelessly communicate, via a wireless link, with the network access device 120. The wireless link may conform to any of a plurality of telecommunications standards or initiatives, such as those described in the 3GPP, including LTE, LTE-Advanced, GSM, GPRS/EDGE, High Speed Packet Access (HSPA), and Universal Mobile Telecommunications System (UMTS). Additionally or alternatively, the wireless link may conform to any of a plurality of standards described in the 3GPP2, including Interim Standard 95 (IS-95), Code Division Multiple Access (CDMA) 2000 standards 1×RTT or 1×EV-DO. The wireless link may also be compatible with other standards, such as those described by the Institute of Electrical and Electronics Engineers (IEEE), or other industry forums, such as the WiMAX forum.

The access device 120 may be an eNB, a base station, or other components that promote network access for the UE 110. The access device 120 may communicate with any UE 110, which may be within the same cell 130, directly via a direct link. For instance, the direct link may be a point-to-point link established between the access device 120 and the UE 110 and used to transmit and receive signals between the two. The UE 110 may also communicate with at least a second UE 110 within the same cell. Additionally, the access device 120 may also communicate with other components or devices (not shown) to provide those other components of the wireless communication system 100 access to other networks.

The UE 110 and the access device 120 may wirelessly communicate via at least one downlink (DL) channel, at least one uplink (UL) channel, or both. The downlink and uplink channels may be physical channels, which may be statically, semi-statically, or dynamically allocated network resources. For instance, the downlink and uplink channels may comprise at least one physical downlink shared channel (PDSCH), at least one physical downlink control channel (PDCCH), at least one physical uplink shared channel (PUSCH), at least one physical uplink control channel (PUCCH), or combinations thereof. In an embodiment, the downlink and uplink channels may be established using frequency-division duplexing (FDD), where signals are received and transmitted at different frequencies. Additionally or alternatively, the downlink and uplink channels may be established using time-division, where the signals may be transmitted, received, or both at different transmission time intervals (TTIs).

In an embodiment, the access device 120 may transmit user data, such as voice, video, or other communication data, to the UE 110 over a DL, such as the PDSCH. The access device 120 may also transmit control data, such as resource allocation and hybrid automatic repeat request (HARQ) data, to the UE over the PDCCH. The access device 120 may receive from the UE 110 user data over an UL, such as the PUSCH, control data over the PUCCH, or both. The wireless communication system 100, may support the LTE-A standard, where the user data and control data may be transported using a plurality of CCs that extend a predetermined bandwidth. For example, the user data and control data may be transmitted using about five CCs, which may be distributed about equally over a total combined bandwidth of about 100 mega Hertz (MHz), e.g., each CC may comprise a bandwidth of about 20 mega Hertz (MHz). The user data and control data may also be transported over each CC using the 3GPP Release 8 (R8) standard. As such, the data may be received over a single CC using the R8 standard or over multiple CCs using the LTE-A standard.

In an embodiment, the UE 110 may transmit the user data over the DL and/or control data over the PDCCH using a semi-static configuration. Accordingly, at least one CC may be assigned to the user data at some time intervals, which may be greater than about a duration of a sub-frame, e.g., about one millisecond. For example, the time delays between switching or reassigning the CCs over the DL may be equal to about a few seconds or minutes. The time intervals of the semi-configuration may be larger than the time intervals used in a dynamic configuration, which may be on the order of a duration of a sub-frame or equal to about one millisecond. As such, the CCs may be assigned or switched less frequently using the semi-static configuration, which may reduce the procedure complexity, reduce communications and hence power consumption, or both.

Figure 2:
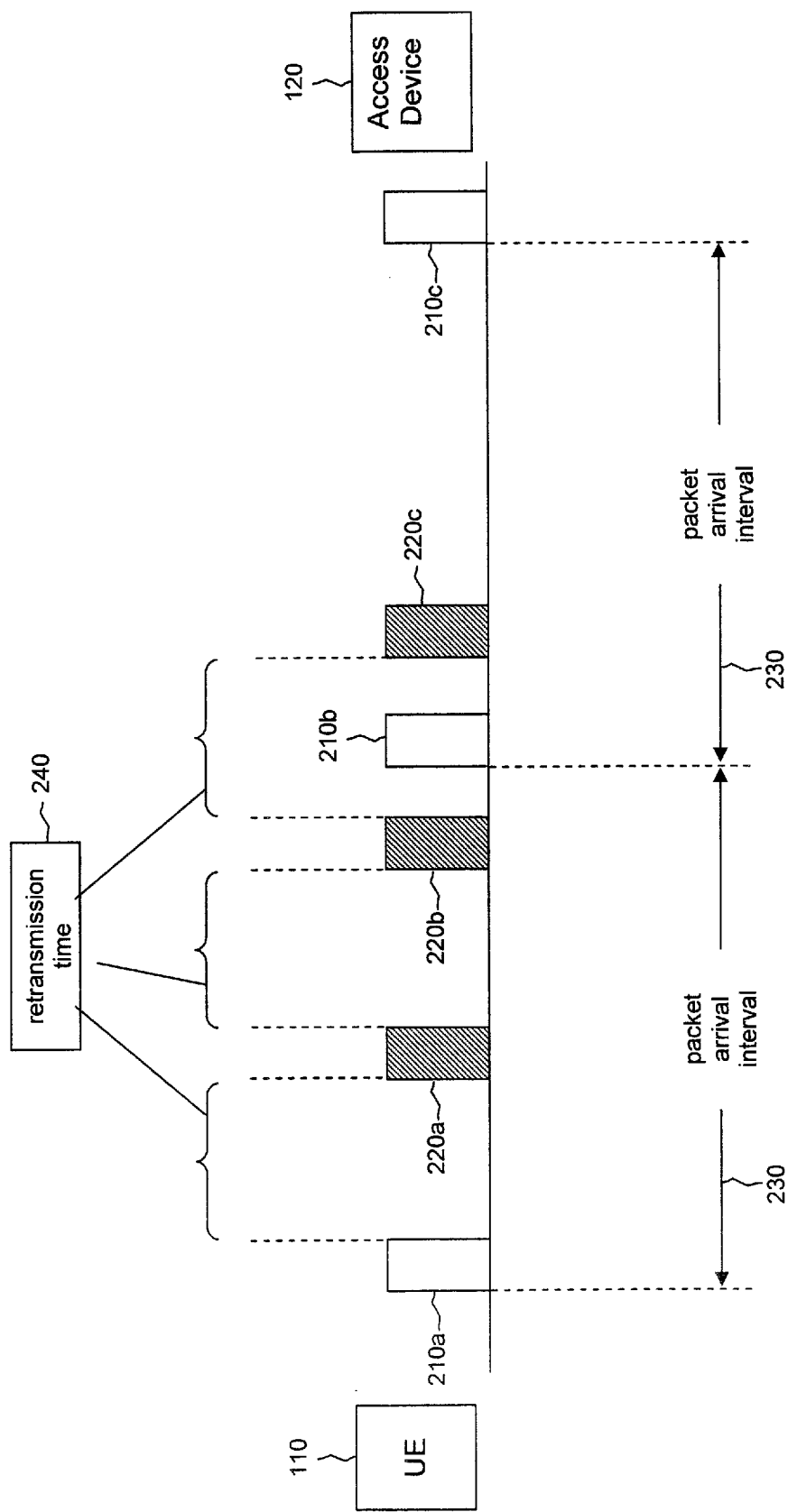
FIG. 2 is an illustration of data transmissions and retransmissions according to an embodiment of the disclosure.

FIG. 2 illustrates a series of data transmissions from an access device 120 to a UE 110. The data transmissions may include initial transmissions 210 and retransmissions 220 that occur when the UE 110 does not successfully receive one or more initial transmissions 210. The UE 110 may identify the initial transmissions 210 from the retransmissions 220 by detecting a new data indicator (NDI), which may be received via the PDCCH. The initial transmissions 210 may include the HARQ error detection bits and occur at periodic packet arrival intervals 230, typically 20 milliseconds. Upon receiving an initial transmission 210, the UE 110 may attempt to decode the error detection bits. If the decoding is successful, the UE 110 may accept the data packet associated with the initial data transmission 210 and send an acknowledgement (ACK) message to the access device 120. If the decoding is unsuccessful, the UE 110 may place the data packet associated with the initial data transmission 210 in a buffer and send a non-acknowledgement (NACK) message to the access device 120.

If the access device 120 receives a NACK message, the access device 120 may send a retransmission 220 of the initial transmission 210. The retransmissions 220, like the initial transmissions 210, may include HARQ error detection bits. If the decoding of a retransmission 220 together with its corresponding initial transmission 210 is unsuccessful, the UE 110 may send another NACK message, and the access device may send another retransmission 220. The UE 110 typically combines an initial transmission 210 and its corresponding retransmissions 220 before the decoding. The interval between an initial transmission 210 and its first retransmission 220 or between two retransmissions 220 is typically about seven to eight milliseconds and can be referred to as the retransmission time 240.

The process of the access device 120 sending the UE 110 an initial transmission 210, waiting for an ACK or NACK message from the UE 110, and sending at least one retransmission 220 when a NACK message is received can be referred to as a HARQ process. In an embodiment, the access device 120 may support a limited number of HARQ processes, for instance about eight HARQ processes for each CC. Each HARQ process may correspond to one initial transmission 210 and its corresponding retransmissions 220, which may be designated by a unique HARQ process ID via the PDCCH.

For example, the UE 110 may not successfully receive a first initial transmission 210a and may send a NACK to the access device 120. Upon receiving the NACK, the access device 120 may send the UE 110 a first retransmission 220a. The UE 110 may not successfully receive the first retransmission 220a and send another NACK. The access device 120 may then send a second retransmission 220b, which the UE 110 again may not successfully receive. The UE 110 may send a third NACK, and the access device 120 may send a third retransmission 220c after a second initial transmission 210b and before a third initial transmission 210c. The UE 110 may use the HARQ process ID for each of the retransmissions 220a, 220b, and 220c to associate the retransmissions 220a, 220b, and 220c with the first initial transmission 210a.

Figure 3:
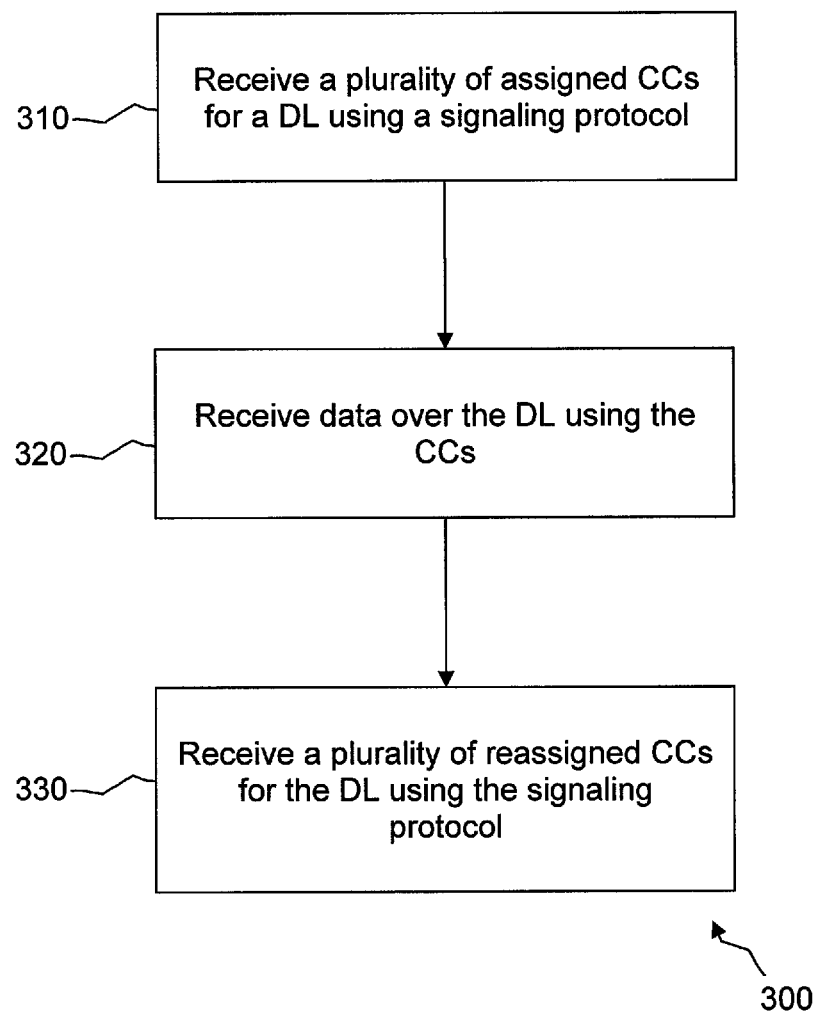
FIG. 3 is a flowchart of a method for configuring a plurality of CCs for a downlink according to an embodiment of the disclosure.

FIG. 3 illustrates an embodiment of a method 300 for configuring a plurality of CCs for a DL. In block 310, the access device 120 may allocate the CCs for the DL to the UE 110 using a signaling protocol and the semi-static configuration. For instance, during a call setup, the access device 120 may signal to the UE 110 at least one CC for the DL, such as the PDSCH, using the RRC protocol. The RRC protocol may be responsible for the assignment, configuration, and release of radio resources between a UE and a network node or other equipment. The RRC protocol is described in detail in 3GPP Technical Specification (TS) 36.331. According to the RRC protocol, the two basic RRC modes for a UE are defined as "idle mode" and "connected mode." During the connected mode or state, the UE may exchange signals with the network and perform other related operations, while during the idle mode or state, the UE may shut down at least some of its connected mode operations. Idle and connected mode behaviors are described in detail in 3GPP TS 36.304 and TS 36.331. Alternatively, the access device 120 may allocate the CCs using MAC control elements, which may be less reliable than RRC signaling.

In block 320, the access device 120 may transmit user data to the UE 110 over the DL using the allocated CCs. In block 330, the access device 120 may reconfigure the CCs for the DL using a signaling protocol. For instance, during the call, the access device 120 may switch or reallocate at least some of CCs to the UE 110 via RRC signaling or MAC control elements. To improve the reliability of the CC reconfiguration, the allocated CC information may be synchronized between the access device 120 and the UE 110, for instance using a "start time" in the RRC or MAC signal. The start time may be a time offset relative to a reference time, such as a call initiation time, or may be an absolute time. Alternatively, the allocated CC information may be synchronized according to the R8 standard.

Figure 4:
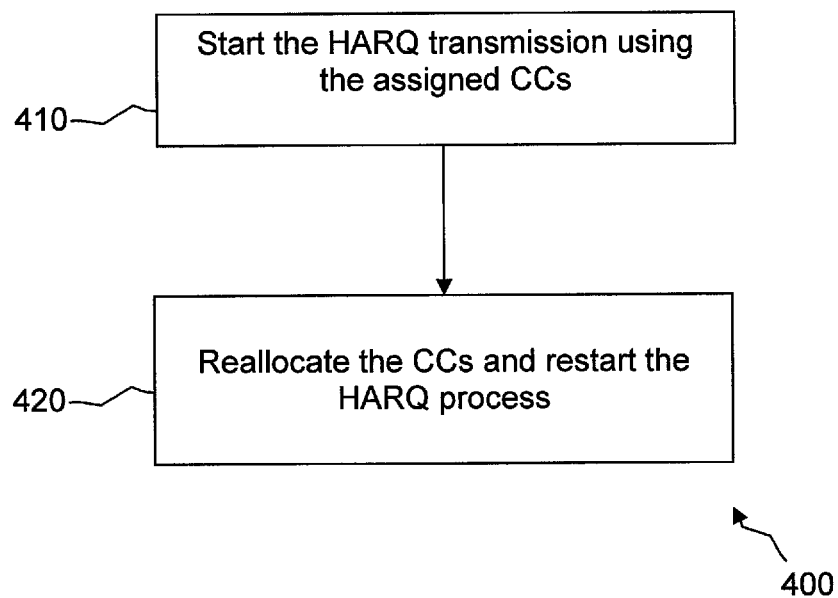
FIG. 4 is a flowchart of a method for supporting Hybrid Automatic Repeat Request transmission during CC reallocation.

FIG. 4 illustrates an embodiment of a method 400 for supporting HARQ transmission during CC reallocation. Specifically, the access device 120 may reallocate the CCs for the UE during the HARQ transmission, where the UE 110 may receive and store at least some HARQ data, e.g., at least one retransmission that corresponds to an initial transmission from the access device 120, using a plurality of assigned CCs. When the CCs are reassigned by the access device 120, the remaining HARQ data may be transmitted using a different set of CCs. Hence, the UE 110 may not be able to associate the incoming HARQ data with the previously received and stored HARQ data, which may cause some loss of data. Thus, after the reallocation of the CCs, the access device 120 may interrupt the HARQ process and restart a new data transmission, e.g., the access device 120 may retransmit the data associated with the HARQ process, before the reallocation of the CCs, as new data. Additionally, the UE 110 may discard the previously transmitted and stored HARQ data, and begin receiving the retransmitted data from the access device 120.

In block 410, the access device 120 may start the HARQ transmission using the CCs assigned to the UE 110. The transmitted HARQ data may be received and stored at the UE 110, for example in a buffer. In block 420, the access device 120 may reallocate a new set of CCs to the UE 110 and interrupt the HARQ transmission by retransmitting the previously transmitted data associated with HARQ process as new data using the reassigned CCs. Additionally, the access device 120 may inform the UE 110 of the new CC configuration via signaling. For instance, the access device 120 may use RRC signaling or MAC control elements to send a new CC configuration to the UE 110. Further, the CC configuration may be sent using a semi-static configuration. As such, the UE 110 may delete the previously received and stored HARQ data, e.g., in the buffer, and use the reassigned CCs to receive the retransmitted data. Although the method 400 may be implemented without substantial complexity, it may be costly in terms of system resources, where some resources may be wasted over transmitting and discarding some of the HARQ data.

Figure 5:
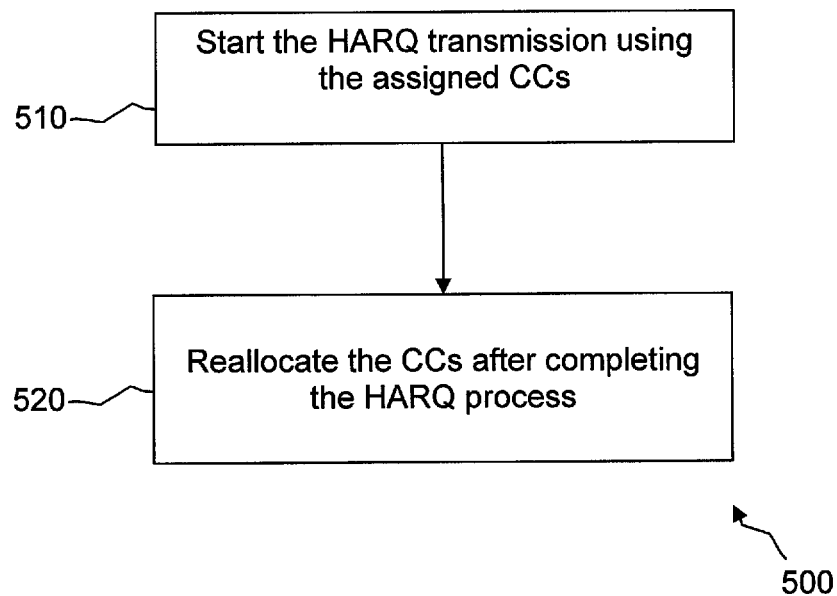
FIG. 5 is a flowchart of another method for supporting Hybrid Automatic Repeat Request transmission during CC reallocation.

FIG. 5 illustrates another embodiment of a method 500 for supporting HARQ transmission during CC reallocation. Specifically, the access device 120 may delay the CC reallocation until a HARQ process is completed, which may prevent discarding some transmitted HARQ data and hence avoid wasting some resources. In block 510, the access device 120 may start the HARQ transmission using the CCs assigned to the UE 110, which may use the assigned CCs to receive the HARQ data. In block 520, the access device 120 may wait until the HARQ process is completed before reallocating a new set of CCs to the UE 110 and informing the UE 110 of the new CC configuration. The UE 110 may receive the complete HARQ data before reconfiguring the CCs to receive future transmissions from the access device 120. The access device 120 may then begin another HARQ process using the reallocated CCs.

Although, the method 500 may avoid wasting some resources, it may reduce the flexibility and efficiency of the CC reallocation process. For instance, the method 500 may not be suitable in the case of continuous data transmissions between the access device 120 and the UE 110. The method 500 may also not be suitable to support increasing transmission rates, where additional CCs may need to be quickly allocated.

In an embodiment, the efficiency of the CC reallocation may be improved by anticipating any potential increase or decrease in the quantity of reallocated CCs. For instance, the access device 120 may anticipate that a subset of assigned CCs may not be used in future transmissions, and hence may stop using such CCs for transmitting HARQ data before reallocating the CCs. Thus, when the CCs are reallocated and the subset of assigned CCs is not reassigned, the HARQ transmission may not be affected.

Figure 6:
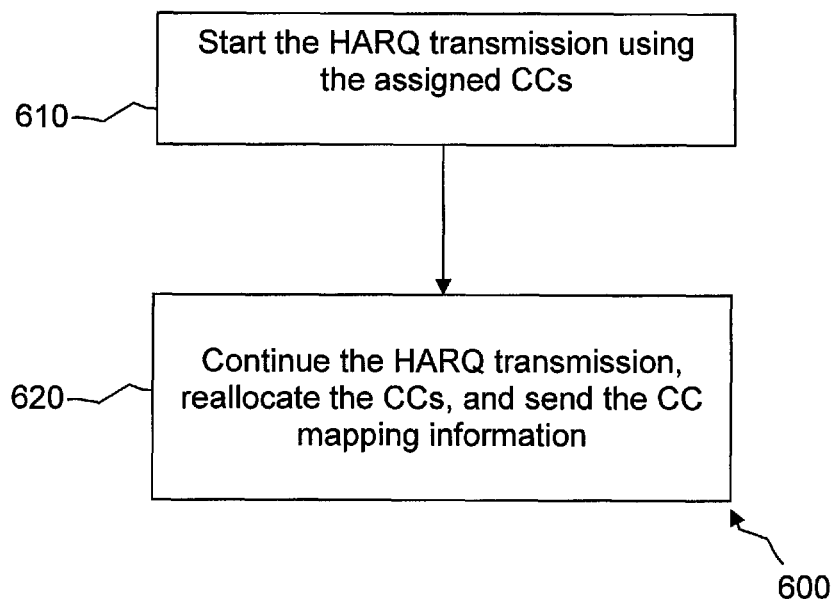
FIG. 6 is a flowchart of another method for supporting Hybrid Automatic Repeat Request transmission during CC reallocation.

FIG. 6 illustrates another embodiment of a method 600 for supporting HARQ transmission during CC reallocation. Specifically, the access device 120 may reallocate the CCs during the HARQ transmission and map the set of newly reassigned CCs to the set of the previously assigned CCs before reallocation. In the case where not all the HARQ processes for the previously assigned CCs need to be reconfigured for retransmission after the CC reallocation, the access device 120 may map the newly reassigned CCs and associated HARQ identifiers (IDs) to at least one previously assigned CC and a HARQ process id before reallocation. The method 600 may also be used for partial HARQ process mapping between a previously assigned CC and a newly assigned CC. For example, when each CC has eight HARQ processes, a subset of the eight HARQ processes, e.g. HARQ processes #1 to #6, may be mapped between a previously assigned CC, e.g. CC#1, and a newly assigned CC, e.g. CC#4. This may allow more flexibility in the HARQ process mapping during the CC switching.

The UE 110 may then receive the mapping information from the access device 120 and continue receiving the remaining HARQ data from the access device 120 using the newly reassigned CCs. The UE 110 may use the mapping between the previously assigned CCs and the newly assigned CCs to associate the HARQ data previously received before the reallocation of the CCs with the remaining HARQ data received after the reallocation of the CCs. As such, the method 600 may provide improved continuity for the HARQ process and may also reduce delays, resource waste, and reduce interruption when the CCs are reallocated.

In block 610, the access device 120 may start the HARQ transmission using the CCs assigned to the UE 110. The UE 110 may use these assigned CCs to receive initial HARQ data. In block 620, the access device 120 may continue the HARQ transmissions, reallocate a new set of CCs to the UE 110, and inform the UE 110 of the mapping between the new set of CCs and the previous set of assigned CCs. For instance, the access device 120 may send a CC mapping table to the UE 110 using a signaling protocol, such as RRC or MAC signaling. Thus, the UE 110 may continue receiving the HARQ data using the reallocated CCs and associate the HARQ data with the initial HARQ data received using the previously assigned CCs.

In one instance, the number of CCs assigned before reallocating the CCs may be equal to the number of reassigned CCs, and the mapping relation between the two sets of CCs may be a one-to-one relation that is represented using a mapping table. For example, the previous CC configuration before reallocating the CCs may comprise three assigned CCs labeled as X1, X2, and X3, which may be replaced by a new CC configuration comprising three newly reassigned CCs labeled Y1, Y2, and Y3. Accordingly, the mapping information may be represented using the following CC mapping Table 1.

TABLE 1

| Previous CC configuration | New CC configuration |
| --- | --- |
| X1 | Y1 |
| X2 | Y2 |
| X3 | Y3 |

The mapping information above may be used to associate each previously assigned CC with a corresponding newly reassigned CC, where X1 may be replaced by Y1, X2 may be replaced by Y2, and X3 may be replaced by Y3. Since each CC is used to transmit some HARQ data, the mapping relation between the CCs may in turn be used to associate each previous HARQ transmission before CC reallocation with the corresponding remaining HARQ transmission after CC reallocation. Thus, the HARQ process may be completed during CC reallocation without substantial interruption, and no HARQ data may be discarded or dropped, for instance in the buffer of the UE 110.

In an embodiment, the number of CCs assigned before reallocating the CCs may be less than the number of reassigned CCs, where at least one additional CC may be assigned after CC reallocation. For example, the previous CC configuration before reallocating the CCs may comprise two assigned CCs, X1 and X2, which may be replaced by a new CC configuration comprising three newly reassigned CCs, Y1, Y2, and Y3. Accordingly, the mapping information may indicate which reassigned CCs are associated with the previously assigned CCs, which may be represented using the following CC mapping Table 2.

TABLE 2

| Previous CC configuration | New CC configuration |
| --- | --- |
| X1 | Y1 |
| X2 | Y2 |
|  | Y3 |

The mapping information above may be used to associate each previously assigned CC with a corresponding newly reassigned CC, where X1 may be replaced by Y1, and X2 may be replaced by Y2. Since each previously assigned CC may be associated with a corresponding newly reassigned CC, the HARQ process may be continued during CC reallocation without discarding any HARQ data in the buffer of the UE 110.

In an embodiment, the number of CCs assigned before reallocating the CCs may be larger than the number of reassigned CCs. For example, the previous CC configuration before reallocating the CCs may comprise three assigned CCs, X1, X2, and X3, which may be replaced by a new CC configuration comprising only two newly reassigned CCs, Y1 and Y2. The mapping information may indicate which reassigned CCs are associated with the previously assigned CCs and which previously assigned CCs may not be replaced or may be unmapped, which may be represented using the following CC mapping Table 3.

TABLE 3

| Previous CC configuration | New CC configuration |
| --- | --- |
| X1 | Y1 |
| X2 | Y2 |
| X3 |  |

The mapping information above may be used to associate some of the previously assigned CCs with a corresponding newly reassigned CC, where X1 may be replaced by Y1, and X2 may be replaced by Y2. Since one previously assigned CC, e.g., X3, may not be replaced or associated with a corresponding newly reassigned CC, the HARQ data previously transmitted using such CC and buffered at the UE 110 may be discarded while the other previously transmitted HARQ data before CC reallocation, e.g. transmitted using X1 and X2, may be associated with the remaining HARQ data transmitted after CC reallocation, e.g., using Y1 and Y2.

In other embodiments, instead of using a CC mapping table, the previous set of assigned CCs before reallocation and the new set of CCs after reallocation may be mapped using the index or order of each CC. For instance, the access device 120 may signal the CC information to the UE 110, where the CCs may be mapped based on their order. For example, if three previously assigned CCs are replaced by three newly reassigned CCs, a list of six CCs may be sent. The first three CCs in the list, which may be the previously assigned CCs, may be mapped in a one-to-one relation to the remaining three CCs in the list, which may be the newly reassigned CCs, according to the order that they appear on the list. Alternatively, two separate lists may be signaled, where one list may comprise the previously assigned CCs, and the other list may comprise the newly reassigned CCS. In some cases, only the list of newly reassigned CCs may be signaled while the list of previously assigned CCs may be stored and regularly updated to reduce signaling requirements.

In yet another embodiment, a plurality of predetermined mapping relationships between the previous set of CCs and the new set of CCs, for example using a plurality of CC tables, may be stored at the UE 110 and associated with a plurality of corresponding indicators (IDs). As such, instead of sending the complete mapping information, the access device 120 may send to the UE 110 the ID that indicates the mapping information for the CC reconfiguration, which may reduce signaling resources.

Figure 7:
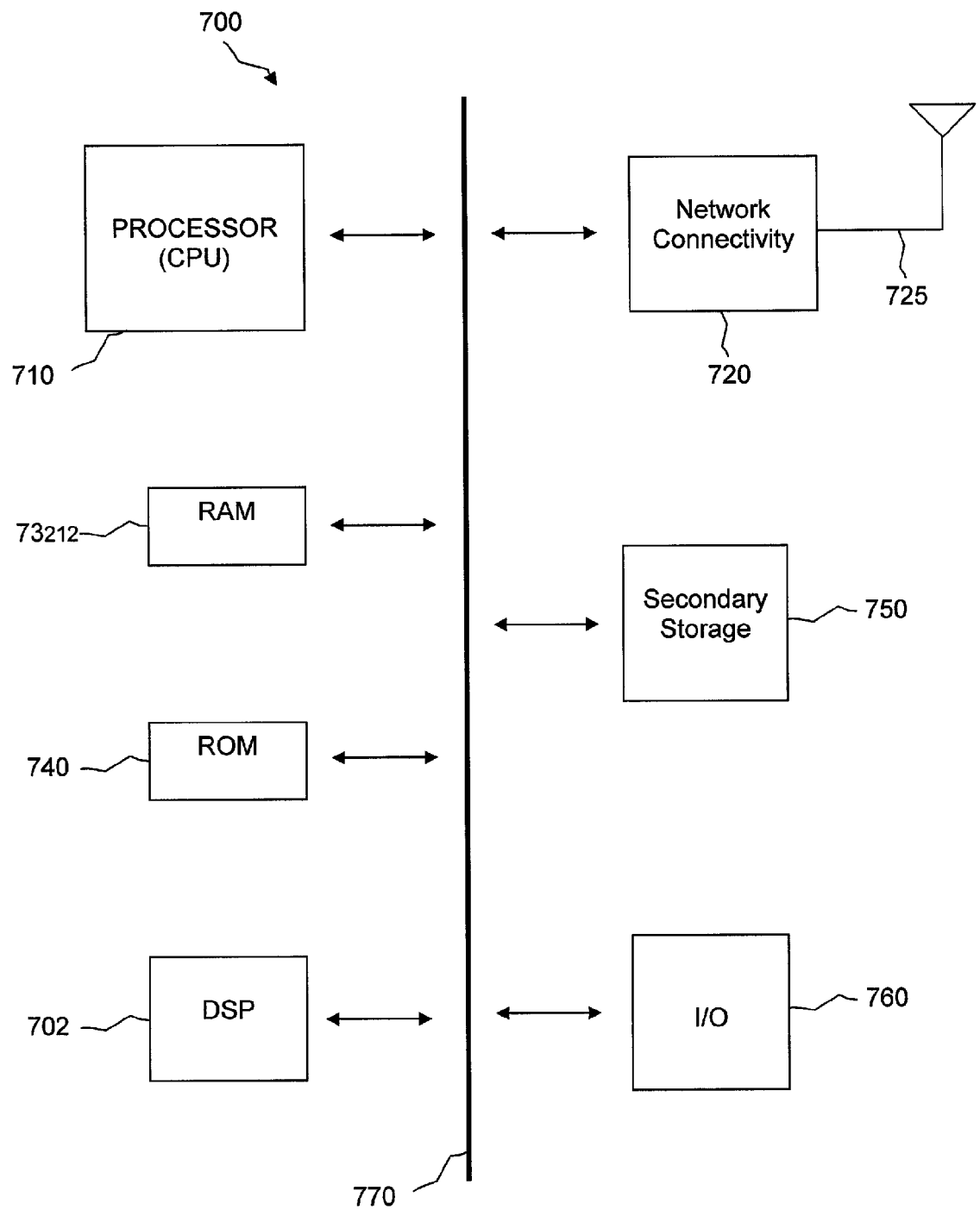
FIG. 7 illustrates a processor and related components suitable for implementing the several embodiments of the present disclosure.

The UE 110 and other components described above might include a processing component that is capable of executing instructions related to the actions described above. FIG. 7 illustrates an example of a system 700 that includes a processing component 710 suitable for implementing one or more embodiments disclosed herein. In addition to the processor 710 (which may be referred to as a central processor unit or CPU), the system 700 might include network connectivity devices 720, random access memory (RAM) 730, read only memory (ROM) 740, secondary storage 750, and input/output (I/O) devices 760. These components might communicate with one another via a bus 770. In some cases, some of these components may not be present or may be combined in various combinations with one another or with other components not shown. These components might be located in a single physical entity or in more than one physical entity. Any actions described herein as being taken by the processor 710 might be taken by the processor 710 alone or by the processor 710 in conjunction with one or more components shown or not shown in the drawing, such as a DSP 702. Although the DSP 702 is shown as a separate component, the DSP 702 might be incorporated into the processor 710.

The processor 710 executes instructions, codes, computer programs, or scripts that it might access from the network connectivity devices 720, RAM 730, ROM 740, or secondary storage 750 (which might include various disk-based systems such as hard disk, floppy disk, or optical disk). While only one CPU 710 is shown, multiple processors may be present. Thus, while instructions may be discussed as being executed by a processor, the instructions may be executed simultaneously, serially, or otherwise by one or multiple processors. The processor 710 may be implemented as one or more CPU chips.

The network connectivity devices 720 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 720 may enable the processor 710 to communicate with the Internet or one or more telecommunications networks or other networks from which the processor 710 might receive information or to which the processor 710 might output information. The network connectivity devices 720 might also include one or more transceiver components 725 capable of transmitting and/or receiving data wirelessly.

The RAM 730 might be used to store volatile data and perhaps to store instructions that are executed by the processor 710. The ROM 740 is a non-volatile memory device that typically has a smaller memory capacity than the memory capacity of the secondary storage 750. ROM 740 might be used to store instructions and perhaps data that are read during execution of the instructions. Access to both RAM 730 and ROM 740 is typically faster than to secondary storage 750. The secondary storage 750 is typically comprised of one or more disk drives or tape drives and might be used for non-volatile storage of data or as an over-flow data storage device if RAM 730 is not large enough to hold all working data. Secondary storage 750 may be used to store programs that are loaded into RAM 730 when such programs are selected for execution.

The I/O devices 760 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 725 might be considered to be a component of the I/O devices 760 instead of or in addition to being a component of the network connectivity devices 720.

The following are incorporated herein by reference for all purposes: 3GPP TS 36.212, 3GPP TS 36.213, 3GPP TS 36.304, 3GPP TS 36.331, 3GPP TS 36.814, and R1-090375.

In an embodiment, a method is provided for supporting HARQ transmission during CC reallocation. The method includes starting a HARQ process using a first CC, allocating a second CC, mapping the HARQ process from the first CC to the second CC, and transmitting remaining HARQ data associated with the HARQ process using the second CC.

In another embodiment, a method is provided for supporting HARQ transmission during CC reallocation. The method includes starting a HARQ process using a first CC, determining to allocate a second CC, waiting until completion of the HARQ process using the first CC before allocating the second CC, and beginning another HARQ process on the second CC.

In another embodiment, a method is provided for supporting HARQ transmission during CC reallocation. The method includes starting a HARQ process using a first CC, allocating a second CC, discontinuing transmission using the first CC before completion of the HARQ process, and restarting transmitting data using the second CC.

In an embodiment, a method is provided for supporting HARQ transmission during CC reallocation. The method includes receiving HARQ data associated with a HARQ process using a first CC, receiving information about the mapping between the first CC and a second CC, and receiving remaining HARQ data associated with the HARQ process using the second CC.

In an embodiment, a method is provided for supporting HARQ transmission during CC reallocation. The method includes receiving HARQ data associated with a HARQ process using a first CC, receiving information about a second CC, discarding any received HARQ data associated with the HARQ process, and receiving retransmitted data using the second CC.

In another embodiment, an access node is provided. The access node includes a processor configured to start a HARQ process using a first CC, allocate a second CC, map the HARQ process from the first CC to the second CC, and transmit remaining HARQ data associated with the HARQ process using the second CC.

In another embodiment, an access node is provided. The access node includes a processor configured to start a HARQ process using a first CC, determine to allocate a second CC, wait until completion of the HARQ process using the first CC before allocating the second CC, and begin another HARQ process on the second CC.

In another embodiment, an access node is provided. The access node includes a processor configured to start a HARQ process using a first CC, allocate a second CC, discontinue transmission using the first CC before completion of the HARQ process, and restart transmitting data using the second CC.

In another embodiment, a UE is provided. The UE includes a processor configured to a processor configured to receive HARQ data associated with a HARQ process using a first CC, receive information about the mapping between the first CC and a second CC, and receive remaining HARQ data associated with the HARQ process using the second CC.

In another embodiment, a UE is provided. The UE includes a processor configured to a processor configured to receive HARQ data associated with a HARQ process using a first CC, receive information about a second CC, discarding any received HARQ data associated with the HARQ process, and receive retransmitted data using the second CC.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for supporting Hybrid Automatic Repeat Request (HARQ) transmission during component carrier (CC) reallocation comprising:
   starting a HARQ process using a first CC for an initial transmission;
   reallocating a second CC;
   mapping the HARQ process from the first CC to the second CC;
   transmitting information about the mapping between the first CC and the second CC, wherein the information about the mapping is used to associate HARQ data previously transmitted using the first CC with remaining HARQ data transmitted using the second CC, wherein the information about the mapping between the first CC and the second CC is represented using a mapping table; and
   completing the HARQ process using only the second CC, wherein completing the HARQ process comprises using the second CC for each retransmission of the initial transmission.

2. The method of claim 1, wherein the information between the first CC and the second CC is transmitted using a signaling protocol.

3. The method of claim 2, wherein the signaling protocol is a Radio Resource Control (RRC) protocol.

4. The method of claim 2, wherein the signaling protocol is a Media Access Control (MAC) signaling.

5. The method of claim 1, wherein mapping information between the first CC and the second CC is transmitted using a semi-static configuration.

6. The method of claim 1, wherein a quantity of assigned CCs may be less than or equal to the quantity of corresponding newly reassigned CCs, and wherein no HARQ data is discarded.

7. The method of claim 1, wherein a quantity of assigned CCs may be larger than the quantity of corresponding newly reassigned CCs, and wherein at least some HARQ data transmitted using an unmapped CC is discarded.

8. A method for supporting Hybrid Automatic Repeat Request (HARQ) transmission during component carrier (CC) reallocation comprising:
   starting a HARQ process using a first CC for an initial transmission;
   determining to allocate a second CC;
   waiting until completion of the HARQ process using only the first CC before allocating the second CC, wherein completion of the HARQ process comprises using the first CC for each retransmission of the initial transmission;
   starting another HARQ process using the second CC for another initial transmission;
   anticipating a subset of assigned CCs that will not be used for future transmissions; and
   not using the anticipated subset of assigned CCs for transmitting HARQ data before reallocating the CCs.

9. The method of claim 8 further comprising transmitting information about the second CC.

10. The method of claim 9, wherein the information about the second CC is transmitted using a signaling protocol.

11. The method of claim 9, wherein the information about the second CC is transmitted using a semi-static configuration.

12. A method for supporting Hybrid Automatic Repeat Request (HARQ) transmission during component carrier (CC) reallocation comprising:
   starting a HARQ process using a first CC for an initial transmission;
   reallocating a second CC;
   transmitting information about the second CC;
   discontinuing transmission using the first CC before completion of the HARQ process;
   restarting the HARQ process using the second CC, wherein restarting the HARQ process comprises retransmitting previously transmitted data associated with the initial transmission as new data; and completing the HARQ process using only the second CC, wherein completing the HARQ process comprises using the second CC for each retransmission of the initial transmission.

13. The method of claim 12, wherein the information about the second CC is transmitted using a signaling protocol.

14. The method of claim 12, wherein the information about the second CC is transmitted using a semi-static configuration.

15. A method for supporting Hybrid Automatic Repeat Request (HARQ) transmission during component carrier (CC) reallocation comprising:
receiving HARQ data associated with a HARQ process using a first set of CCs;
receiving information about a mapping between the first set of CCs and a second set of CCs; and
receiving remaining HARQ data associated with the HARQ process using only the second set of CCs, wherein the information about the mapping is used to associate HARQ data previously received using the first set of CCs with the remaining HARQ data received using the second set of CCs, and wherein the information about the mapping between the first set of CCs and the second set of CCs is represented using a mapping table.

16. The method of claim 15, wherein the information about the mapping between the first set of CCs and the second set of CCs is received using a signaling protocol, a semi-static configuration, or both.

17. An access node to promote Hybrid Automatic Repeat Request (HARQ) transmission during component carrier (CC) reallocation comprising:
a processor configured to:
start a HARQ process using a first CC for an initial transmission;
reallocate a second CC;
map the HARQ process from the first CC to the second CC;
transmit information about the mapping between the first CC and the second CC, wherein the information about the mapping is used to associate HARQ data previously transmitted using the first CC with remaining HARQ data transmitted using the second CC, wherein the information about the mapping between the first CC and the second CC is represented using a mapping table; and
complete the HARQ process using only the second CC, wherein completing the HARQ process comprises using the second CC for each retransmission of the initial transmission.

18. An access node to promote Hybrid Automatic Repeat Request (HARQ) transmission during component carrier (CC) reallocation comprising:
a processor configured to:
start a HARQ process using a first CC for an initial transmission;
determine to allocate a second CC;
wait until completion of the HARQ process using only the first CC before allocating the second CC, wherein completion of the HARQ process comprises using the first CC for each retransmission of the initial transmission;
start another HARQ process using the second CC for another initial transmission;
anticipate a subset of assigned CCs that will not be used for future transmissions; and
not use the anticipated subset of assigned CCs for transmitting HARQ data before reallocating the CCs.

19. An access node to promote Hybrid Automatic Repeat Request (HARQ) transmission during component carrier (CC) reallocation comprising:
a processor configured to:
start a HARQ process using a first CC for an initial transmission;
reallocate a second CC;
transmitting information about the second CC;
discontinue transmission using the first CC before completion of the HARQ process;
restart the HARQ process using the second CC, wherein restarting the HARQ process comprises retransmitting previously transmitted data associated with the initial transmission as new data; and
completing the HARQ process using only the second CC, wherein completing the HARQ process comprises using the second CC for each retransmission of the initial transmission.

20. A user equipment (UE) to promote Hybrid Automatic Repeat Request (HARQ) transmission during component carrier (CC) reallocation comprising:
a processor configured to:
receive HARQ data associated with a HARQ process using a first set of CCs;
receive information about a mapping between the first set of CCs and a second set of CCs; and
receive remaining HARQ data associated with the HARQ process using only the second set of CCs, wherein the information about the mapping is used to associate HARQ data previously transmitted using the first set of CCs with the remaining HARQ data transmitted using the second set of CCs, wherein the information about the mapping between the first set of CCs and the second set of CCs is represented using a mapping table.

* * * * *

UNITED STATES PATENT AND TRADEMARK OFFICE
CERTIFICATE OF CORRECTION

PATENT NO. : 8,971,242 B2  
APPLICATION NO. : 12/750285  
DATED : March 3, 2015  
INVENTOR(S) : Zhijun Cai et al.

It is certified that error appears in the above-identified patent and that said Letters Patent is hereby corrected as shown below:

In the Claims

Column 13, Claim 17, Line 33 cancel the text "a processor configured to:" and insert the following --a processor; a memory coupled to the processor, wherein the memory comprises instructions which, when executed by the processor, cause the processor to:--

Column 14, Claim 18, Line 1 cancel the text "a processor configured to:" and insert the following --a processor; a memory coupled to the processor, wherein the memory comprises instructions which, when executed by the processor, cause the processor to:--

Column 14, Claim 19, Line 20 cancel the text "a processor configured to:" and insert the following --a processor; a memory coupled to the processor, wherein the memory comprises instructions which, when executed by the processor, cause the processor to:--

Column 14, Claim 20, Line 39 cancel the text "a processor configured to:" and insert the following --a processor; a memory coupled to the processor, wherein the memory comprises instructions which, when executed by the processor, cause the processor to:--

Signed and Sealed this  
First Day of December, 2015

Michelle K. Lee  
*Director of the United States Patent and Trademark Office*